Patented May 4, 1954

2,677,672

UNITED STATES PATENT OFFICE 2,677,672

ADHESIVE FOR WOOD COMPRISING AN AQUEOUS POLYVINYL ACETATE EMULSION AND A VINYL METHYL ETHER-MALEIC ANHYDRIDE COPOLYMER

Stewart B. Luce, La Grange, Ill., assignor to Swift & Company, Chicago, Ill., a corporation of Illinois No Drawing. Application December 7, 1951, Serial No. 260,581

6 Claims. (Cl. 260—29.6)

The present invention relates in general to an improved adhesive, and more particularly to a polyvinyl acetate wood adhesive having a high resistance to cold flow and a high shear strength.

Adhesives and films formed from polyvinyl acetate emulsions are well known and have found widespread acceptance in many fields. It has been recognized in the past that increased flexibility and toughness may be imparted to such adhesives or films by the addition to the polyvinyl acetete emulsion of various plasticizers. However, being a thermoplastic material, polyvinyl acetate will "flow" if subjected to stress, particularly at elevated temperatures. This inherent property of the heretofore available polyvinyl acetate films and adhesives has presented a defiite disadvantage in the use of such films under conditions where stress was to be, or might be applied to the material. Additives for improving the cold flow properties of polyvinyl acetate films have been disclosed in copending applications of S. B. Luce, but such additives have been found to reduce the shear strength of films formed from the emulsions so treated.

It is therefore an object of the present invention to provide an improved polyvinyl acetate adhesive which has both a high shear strength and a high resistance to cold flow.

It is an additional object of the invention to provide a method for preparing an improved polyvinyl acetate adhesive.

Additional objects if not specifically set forth herein will be readily apparent to one skilled in the art from the following detailed description of the invention:

Generally, the present invention contemplates the addition to commercially available aqueous polyvinyl acetate emulsions of a compound which has been found to possess the properties of greatly increasing the resistance to cold flow of films formed from polyvinyl acetate emulsions containing such compound, and also of retaining about the same high shear strength as films made from the untreated polyvinyl acetate emulsions.

More specificaly, it has been found that by preparing a physical mixture of a conventional polyvinyl acetate emulsion and a copolymer of vinyl methyl ether-maleic anhydride, an adhesive is produced which when applied to wood and dried possesses a high resistance to cold flow and also a sufficiently high shear strength to function as a highly efficient wood adhesive.

The polyvinyl acetate emulsions which may be used in the present invention are any of the commercially available aqueous emulsions known to the art, as, for example, P. V. A. emulsion 81-900 described in Du Pont's pamphlet V3,348 or the Shawinigan Gelva emulsions described in their pamphlet on Gelva issued in 1948. Du Pont 81-900 has a 55% solids content, an emulsion viscosity of 8-10 poises, contains 1% monomer, has a pH of 4-6, and a particle size of 3 microns, as specified in the aforesaid pamphlet. The Shawinigan "Gelva" emulsions as described in their pamphlet referred to above, have a 55% solids content, an emulsion viscosity of 6-10 poises, contain 1-1.5% monomer, have a pH of 4-6, and a particle size of 0.5-1.0 microns. These emulsions, in general, are white, milky liquids of creamy or watery consistency, having a pH in the neighborhood of about 3.5 to 4.0 or above. In all of these commercially available emulsions, the polymer is fully acetylated and is water insoluble. Any of these commercially available aqueous emulsions either with or without conventional plasticizers such as dicarbitol phthalate, ethyl acetyl glycolate, tricresyl phosphate, dibutyl phthalate or the like, may be used in the present invention. The "Aroclors" (chlorinated biphenyls), preferably those liquid at room temperatures such as Aroclor 1260 or 1262, may also be used as plasticizers. The "Aroclors" are fully described in Application Data Bulletin No. P-115 of The Monsanto Chemical Company.

Vinyl methyl ether-maleic anhydride copolymers having specific viscosities of from about 0.6 to about 2.7, determined on 1 gram of copolymer in 100 ml. of methyl ethyl ketone, have been found to give the best results. These copolymers are linear in nature and consist of alternating methyl vinyl ether and maleic anhydride units, e. g.

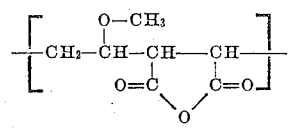

These compounds are fully described in the pamphlet "PVM/MA—A New Water Soluble Polymer," New Product Bulletin No. P-103, issued January 3, 1951, by the Product Development Department of General Aniline & Film Corporation. Higher viscosity copolymers may be used, but tend to cause a stringy consistency in the copolymer-polyvinyl acetate emulsion mixture. The copolymers are preferably added to the emulsion in the form of an aqueous solution. However, the adhesive may be prepared by first adding a plasticizer to the polyvinyl acetate emulsion and then stirring in the aqueous solution of the copolymer, or first mixing the emulsion and the aqueous solution of copolymer together and then adding the plasticizer, or adding the emulsion to the copolymer solution and plasticizer, without affecting the nature of the final mixture.

The following examples demonstrate the preparation of typical adhesives of the present invention, and are furnished for the purpose of illustration only:

EXAMPLE I 4.5 parts of a 50% dibutyl phthalate–50% Aroclor plasticizer were added to 145.5 parts of polyvinyl acetate emulsion 81–900 Du Pont and mixed thoroughly. To this mixture, at room temperature, were added 125 parts of a 10% aqueous solution of vinyl methyl ether-maleic anhydride copolymer of specific viscosity 2.7. The mixture was then stirred to give a uniform adhesive of viscosity 43.5 poises at 79° F.

EXAMPLE II 2.2 parts of a 50% dibutyl phthalate–50% Aroclor plasticizer were added to 72.8 parts of the same polyvinyl acetate emulsion as in Example I. After thorough mixing, 31.5 parts of a 20% aqueous solution of vinyl methyl ether-maleic anhydride copolymer of specific viscosity 0.6 were added. After stirring, the viscosity of the resulting adhesive was 26 poises at 78° F.

The copolymer may be used in amounts ranging from about 0.1% to 15% or more solid copolymer based on the polyvinyl acetate solids in the emulsion. The plasticizers used may be present in amounts up to about 6% by weight based on the polyvinyl acetate solids in the emulsion, although the use of a plasticizer is not necessary.

Tests were conducted, as illustrated in the following tables, to determine the improvement in the resistance to cold flow of films made in accordance with the present invention as compared with films made from conventional, untreated polyvinyl acetate emulsions. In each case, films were cast on glass by means of a Bird applicator. After partly drying, the films were removed and further dried in air. The dry films were then cut into strips 4 inches long, and of a width such as to give any desired cross-sectional area, i. e. a thick film would be cut narrower than a thin film for a given cross-sectional area. These strips were then marked across the width with a crayon line placed one inch from each end of the strip, thus leaving a distance of two inches between the markings on each strip. The marked strips were then suspended by one end and a weight hung from the other end to give any desired stress in pounds per square inch of cross-sectional area. At succeeding time intervals, the distance between the marks was measured and recorded as percent extension of the original two-inch distance.

Table I

[50° C.; stress—60 p. s. i.]

| Film | Percent Extension | |
|---|---|---|
| | 10 min. | 5 hrs. |
| A. Plasticized Polyvinyl Acetate | 50– | 55 |
| B. Composition A plus 15% VME/MA copolymer | 0 | 0 |

Table II

[Room temperature]

| Film | Stress (p. s. i.) | (24 hrs.) Percent Extension |
|---|---|---|
| A. Plasticized Polyvinyl Acetate | 80 | 187.5 |
| B. Composition A plus 0.05% VME/MA copolymer | 85 | 150 |

In the above tables, the VME/MA copolymer had a specific viscosity of 2.7. The abbreviation VME/MA used in these tables and elsewhere in the specification is intended to indicate vinyl methyl ether-maleic anhydride copolymer. The polyvinyl acetate emulsion used in obtaining the above results was Du Pont P. V. A. emulsion 81–900 containing about 5.6% of 50% dibutyl phthalate–50% Aroclor as a plasticizer.

As can be seen from the foregoing data, the addition of varying percentages of the copolymer greatly improved the resistance of the dried films to deformation or cold flow under stress.

Additional tests were conducted to determine the shear strength of adhesive mixtures of the present invention. Table III, below, shows the general tendency of the cold flow improving additives disclosed and claimed in the copending applications of S. B. Luce, to drastically reduce the shear strength of adhesives containing the same, and indicates the superiority of the vinyl methyl ether-maleic anhydride copolymer in this respect. The determination of shear strength recorded in the following tables was made by gluing test blocks of maple wood and then following a procedure such as ASTM D–905–49. The shear test values given are the average of 16 tests in each case.

Table III

[Room temperature]

| Film | Shear Strength, p. s. i. |
|---|---|
| A. Plasticized Polyvinyl Acetate | 2,300 |
| B. Composition A plus 15% protein hydrolyzate | 1,590 |
| C. Composition A plus 15% hide glue 250 g. test | 1,230 |
| D. Composition A plus 15% bone glue 40 g. test | 1,360 |
| E. Composition A plus 15% methyl cellulose | 1,130 |
| F. Composition A plus 15% VME/MA copolymer | 2,395 |

The polyvinyl acetate emulsion used in the above test was Du Pont P. V. A. emulsion 81–900. The plasticizer in each case was 50% dibutyl phthalate–50% Aroclor, present in about 5.6% by weight of the polyvinyl acetate solids in the emulsion. The VME/MA copolymer had a specific viscosity (1 gm. copolymer in 100 ml. methyl ethyl ketone) of 0.6.

Table IV

| Adhesive | Shear Strength (p. s. i.) | | | |
|---|---|---|---|---|
| | Original | 2 wks., 50° C. | 4 wks., 80% R. H. | 2 wks., 50° C., 80% R. H. |
| A. Plasticized Polyvinyl Acetate I | 2,770 | 1,877 (68) | -------- | 780 (28) |
| B. Composition A plus 15% VME/MA copolymer | 2,440 | 1,620, (67) | -------- | 1,370, (56) |
| C. Plasticized Polyvinyl Acetate II | 2,050 | 1,540 (75) | 1,990 (97) | 980 (38) |
| D. Composition C plus 15% VME/MA copolymer | 2,090 | 1,620 (78) | 2,120 (101) | 1,370 (66) |
| E. Plasticized Polyvinyl Acetate III | 2,390 | 1,540 (65) | -------- | 990 (42) |
| F. Composition E plus 15% VME/MA copolymer | 2,180 | 1,810 (83) | -------- | 1,610 (74) |
| G. Plasticized Polyvinyl Acetate IV | 2,010 | 1,430 (71) | -------- | 970 (48) |
| H. Composition G plus 15% VME/MA copolymer | 2,050 | 1,460 (71) | -------- | 1,420 (69) |
| I. Plasticized Polyvinyl Acetate V | 1,530 | 960 (65) | -------- | 440 (29) |
| J. Composition I plus 15% VME/MA copolymer | 2,220 | 1,490 (67) | -------- | 780 (35) |
| K. Plasticized Polyvinyl Acetate VI | 2,740 | 910 (33) | -------- | 390 (14) |
| L. Composition K plus 15% VME/MA copolymer | 2,910 | 1,240 (43) | -------- | 830 (29) |

In the above table, six different polyvinyl acetate emulsions were tested alone, and with the additive of the present invention incorporated therein. The results of shear strength determinations made after aging at the various conditions specified were recorded. The figures given in parentheses represent the percentage of the original shear strength retained after aging at the various conditions. The VME/MA copolymer used in these tests had a specific viscosity of 0.6. P. V. A. emulsion I in Table IV was Du Pont P. V. A. emulsion 81–900. The remaining emulsions were made up from vinyl acetate monomer in a manner typified by the following example:

Example III 450 g. water, 15 g. polyvinyl alcohol (Du Pont 54–22), 0.65 g. Acrosal OT, 1.5 g. sodium bicarbonate, 3.5 cc. hydrogen peroxide (37%) and 645 g. vinyl acetate monomer were mixed to give an emulsion and then heated on a water bath until the temperature of the mixture reached 65°–66° C. at which time refluxing started. The reaction was exothermic and the heat was adjusted to maintain a steady reflux. At the end of the reaction period, the temperature reached 90°–95° C., and refluxing stopped. The emulsion was then cooled and used for test purposes.

Table V

| Adhesive | Shear strength (p. s. i.) | | |
|---|---|---|---|
| | Original | 2 wks., 50° C. | 2 wks., 50° C., 80% R.H. |
| A. Plasticized Polyvinyl Acetate I | 2,720 | 490 (18) | 190 (7) |
| B. Composition A plus 15% VME/MA copolymer | 2,570 | 1,895 (74) | 450 (18) |
| C. Composition A plus 7.5% VME/MA copolymer | 2,870 | 1,750 (61) | 525 (18) |
| D. Composition A plus 3.8% VME/MA copolymer | 2,650 | 1,440 (54) | 560 (21) |
| E. Composition A plus 1.9% VME/MA copolymer | 3,020 | 1,950 (65) | 590 (20) |
| F. Plasticized Polyvinyl Acetate II | 2,510 | 900 (36) | 370 (15) |
| G. Composition F plus 0.95% VME/MA copolymer | 2,570 | 1,470 (57) | 550 (22) |
| H. Composition F plus 0.48% VME/MA copolymer | 2,655 | 1,190 (45) | 420 (16) |
| I. Composition F plus 0.1% VME/MA copolymer | 2,780 | 1,160 (44) | 530 (19) |

The above table shows the effect on shear strength of varying the percentage of VME/MA copolymer in the polyvinyl acetate emulsion. Amounts ranging from 0.1% to 15% by weight of the VME/MA copolymer (specific viscosity 0.6) were incorporated into the polyvinyl acetate emulsions and the effect on shear strength after aging under the indicated conditions recorded. The polyvinyl acetate emulsions used in these tests were prepared in the manner illustrated in Example III.

In general, the VME/MA copolymers will be present in from about 0.1% to about 15% by weight based on the polyvinyl acetate solids in the emulsion. Greater amounts of copolymer may be used without departing from the scope and benefits of the present invention. However, amounts substantially less than about 0.1% are generally ineffective.

The mixtures of the present invention are particularly valuable for application to cellulosic materials such as wood, but obviously find other uses as adhesives for different types of materials or as films where high resistance to cold flow and a high shear strength are desirable.

Obviously, many modifications and variations of the invention as hereinbefore set forth may be made without departing from the spirit and scope thereof, and therefore only such limitations should be imposed as are indicated in the appended claims.

I claim:

1. A method for the preparation of an adhesive having high shear strength and resistance to cold flow which comprises: incorporating into an aqueous emulsion of polyvinyl acetate an amount of vinyl methyl ether-maleic anhydride copolymer ranging from about 0.1% to not substantially in excess of 15% by weight based on the polyvinyl acetate solids in said emulsion.

2. A method as in claim 1 wherein a plasticizer is added to the copolymer-emulsion mixture.

3. A method for the preparation of an adhesive which comprises: incorporating into an aqueous emulsion of polyvinyl acetate about 0.1% to about 15% by weight, based on the polyvinyl acetate solids in said emulsion, of vinyl methyl ether-maleic anhydride copolymer.

4. An adhesive which comprises: a mixture of an aqueous emulsion of polyvinyl acetate and about 0.1% to not substantially in excess of 15% by weight, based on the polyvinyl acetate solids in said emulsion, of vinyl methyl ether-maleic anhydride copolymer.

5. A polyvinyl acetate adhesive having high shear strength and resistance to cold flow which comprises: a mixture of an aqueous emulsion of polyvinyl acetate and about 0.1% to about 15% by weight, based on the polyvinyl acetate solids in said emulsion, of vinyl methyl ether-maleic anhydride copolymer.

6. An adhesive which comprises: a mixture of an aqueous emulsion of polyvinyl acetate, a plasticizer, and about 0.1% to not substantially in excess of 15% by weight, based on the polyvinyl acetate solids in said emulsion, of vinyl methyl ether-maleic anhydride copolymer.

References Cited in the file of this patent

UNITED STATES PATENTS

| Number | Name | Date |
| --- | --- | --- |
| 2,470,911 | Baer | May 24, 1949 |

FOREIGN PATENTS

| Number | Country | Date |
| --- | --- | --- |
| 647,273 | Great Britain | Dec. 6, 1950 |